April 14, 1925.                                                    1,533,551
                         F. L. HOMAN
                        WATER GAUGE
                     Filed Oct. 10, 1922

Inventor
F. L. Homan
By Philip A. Howell
       Attorney

Patented Apr. 14, 1925.

1,533,551

UNITED STATES PATENT OFFICE.

FRANK L. HOMAN, OF OMAHA, NEBRASKA.

WATER GAUGE.

Application filed October 10, 1922. Serial No. 593,518.

*To all whom it may concern:*

Be it known that FRANK L. HOMAN, a citizen of the United States, residing at Omaha, in the county of Douglas and State of Nebraska, has invented certain new and useful Improvements in Water Gauges, of which the following is a specification, reference being had therein to the accompanying drawings.

The invention relates to water gauges, and has for its object to provide in combination with a water gauge having a plurality of sight openings, a lens, the inner side of which is provided with a plurality of V-shaped ribs for preventing reflections and allowing the water level within the gauge to be easily and quickly ascertained.

A further object is to have the V-shaped ribs in stepped relation to each other, thereby forming a plurality of angular surfaces which will not reflect into each other and consequently will present a plurality of surfaces which will allow the water level within the gauge to be easily ascertained as the lens will be free from reflection.

Another object is to provide a metal wall through the center of the water space; by disposing a metal partition in the hollow water space; thereby forming a dark object back of one half of the water in the water chamber of the gauge, the exact quantity of water in the boiler may be accurately determined by a reading of the corrugated gauge glasses.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
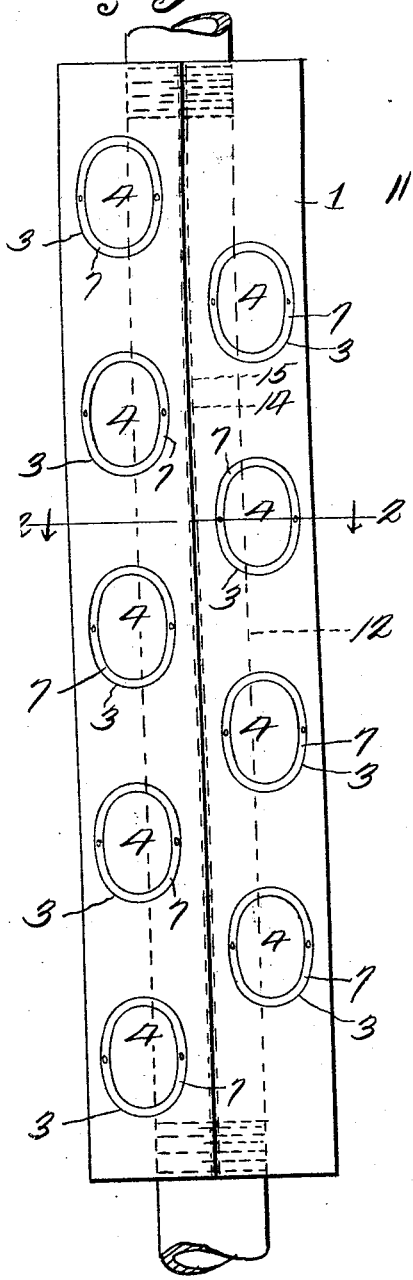
Figure 1 is a front elevation of the gauge.
Figure 2:
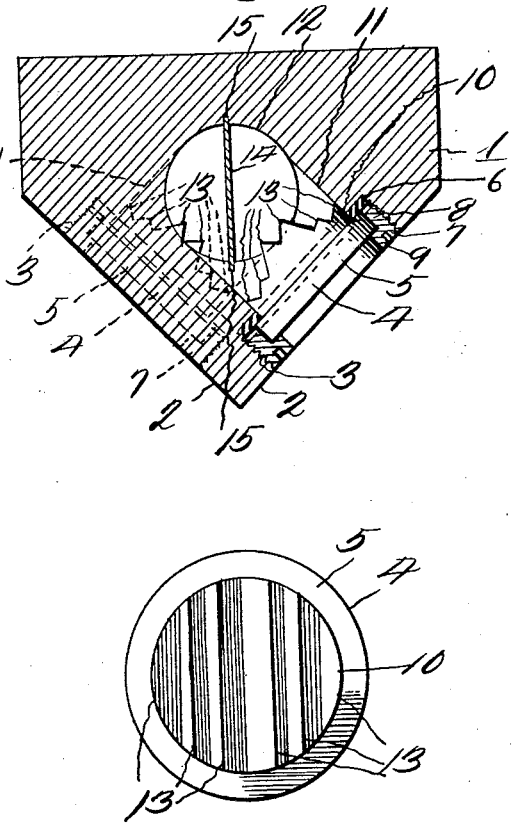
Figure 2 is a horizontal sectional view through the gauge taken on line 2—2 of Figure 1.
Figure 3:
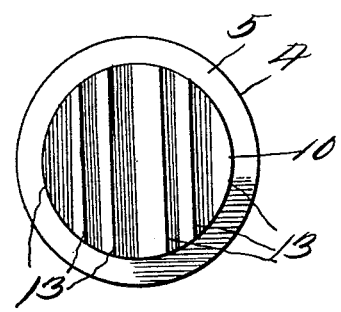
Figure 3 is a view in elevation of the inner side of one of the lenses.

Referring to the drawing, the numeral 1 designates the casing of the gauge, which casing is preferably formed from metal and is provided with right angularly disposed sides 2 having threaded sight openings 3 therein, whereby the water level within the gauge may be read from opposite sides of an engine cab or from different angles. Disposed within the threaded sight openings 3 are lenses 4, which lenses are round and are provided intermediate their ends with annular flanges 5 which rest on rubber gaskets 6, thereby preventing fracturing of the lens when the retaining rings 7 are tightened. The retaining rings 7 are provided with annular flanges 8 for engaging over the periphery of the annular flanges 5 and with inwardly extending flanges 9 for engaging over the outer sides of the flanges 5 and holding the lenses in position with their inner ends 10 in the ports 11, which ports are in communication with the water chamber 12 of the casing 1.

It has been found that unless the light rays passing through the lenses 4 are broken up and diffused, reflections prevent the easy reading of the water level through the lenses. To overcome this difficulty the inner ends 10 of the lenses 4 are provided with vertically disposed V-shaped ribs 13 in stepped relation to each other from centrally outwardly to the sides of the lens and of varying sizes, which V-shaped ribs by being in stepped relation and of varying sizes form a plurality of flat surfaces at different angles to each other and of different sizes, thereby breaking up the light rays and preventing reflections and allowing a horizontal water line to be easily read across vertically disposed lines formed by the sharp edges of the vertically disposed ribs 13.

The chamber 11 is divided vertically by a partition 14, which is disposed in channels 15 in the opposite walls thereby forming a dark background for the sight openings and preventing entrance of light from opposite sight holes.

The invention having been set forth what is claimed as new and useful is:—

The combination with a water gauge having a sight opening therein, a round lens disposed within the sight opening, of a plurality of vertically disposed V-shaped ribs carried by the inner side of the lens, said ribs being in stepped relation to each other from centrally of the lens outwardly to opposite sides thereof.

In testimony whereof I hereunto affix my signature.

FRANK L. HOMAN.